(12) United States Patent
Matthews

(10) Patent No.: US 6,178,849 B1
(45) Date of Patent: Jan. 30, 2001

(54) CONNECTING ROD ASSEMBLY FOR AN INTERNAL COMBUSTION ENGINE

(75) Inventor: William F. Matthews, Lafayette, IN (US)

(73) Assignee: Caterpillar Inc., Peoria, IL (US)

( * ) Notice: Under 35 U.S.C. 154(b), the term of this patent shall be extended for 0 days.

(21) Appl. No.: 09/325,990

(22) Filed: Jun. 4, 1999

(51) Int. Cl.⁷ .............................. G05G 1/00; F16B 27/00
(52) U.S. Cl. ........................................... 74/579 E; 411/84
(58) Field of Search .......................... 74/579 R, 579 E; 384/288, 294, 429, 430, 434; 411/84, 85, 90, 102, 116, 169, 973, 379, 385

(56) References Cited

U.S. PATENT DOCUMENTS

| | | | |
|---|---|---|---|
| 2,846,897 | * | 8/1958 | Schall .................................. 74/579 E |
| 3,059,589 | * | 10/1962 | Schreyer ............................. 411/84 X |
| 4,114,961 | * | 9/1978 | Pithie .............................. 74/579 E X |
| 4,396,309 | | 8/1983 | McCormick ........................... 403/14 |
| 4,688,446 | | 8/1987 | Ishikawa ............................. 74/579 E |
| 4,836,043 | * | 6/1989 | Morris et al. ....................... 74/579 E |
| 4,856,366 | * | 8/1989 | Nikolaus ......................... 74/579 E X |
| 4,872,395 | | 10/1989 | Bennitt et al. ......................... 92/139 |
| 5,036,727 | * | 8/1991 | Engel ................................. 74/579 E |
| 5,048,368 | * | 9/1991 | Mrdjenovich et al. ............ 74/579 E |
| 5,197,425 | | 3/1993 | Santi ................................. 123/197.3 |
| 5,562,068 | | 10/1996 | Sugimoto et al. ................. 123/48 B |
| 5,758,550 | * | 6/1998 | Lenczyk ............................. 74/579 E |
| 5,823,727 | * | 10/1998 | Lee ........................................ 411/85 |

* cited by examiner

Primary Examiner—Charles A Marmor
Assistant Examiner—Roger Pang
(74) Attorney, Agent, or Firm—Todd T. Taylor

(57) ABSTRACT

A connecting rod assembly connects a piston to a crankshaft in an internal combustion engine. The connecting rod assembly includes a connecting rod having a yoke at an end thereof. The yoke includes a semi-circular bearing portion and a pair of shoulders. The yoke further includes at least two bolt holes associated with and opening at each shoulder. A cap is attached with the yoke, and includes a semi-circular bearing portion and a pair of shoulders. The cap further includes at least two bolt holes associated with each shoulder. Each bolt hole opens at a respective shoulder and is substantially coaxially aligned with a respective bolt hole in the yoke to define a mating pair of bolt holes. A plurality of bolts are each disposed in a respective mating pair of bolt holes and attach the cap with the yoke. Each bolt has a head with a non-circular cross section which abuts a head of an adjacent bolt and prevents unlimited rotation therebetween.

11 Claims, 3 Drawing Sheets

CONNECTING ROD ASSEMBLY FOR AN INTERNAL COMBUSTION ENGINE

TECHNICAL FIELD

The present invention relates to internal combustion engines, and, more particularly, to connecting rod assemblies for use in internal combustion engines.

BACKGROUND ART

A connecting rod assembly is used for connecting a piston to a crankshaft in an internal combustion engine. The connecting rod assembly typically includes a connecting rod which is attached to a cap using a plurality of bolts. The connecting rod includes a first end which is attached to a piston using a piston pin. The opposite end includes a yoke with a semi-circular bearing portion which mates with a corresponding semi-circular bearing portion in the cap to define an opening for receiving the crankshaft therein. Typically, each bolt includes a head at one end and an opposite end which is threadingly engaged with a nut. To attach the cap to the yoke, it is necessary to place a wrench on both the head and the nut while tightening the nut to prevent rotation of the bolt. However, for certain applications it may be difficult or nearly impossible to access the bolt head to prevent rotation of the bolt.

It is also known to provide the connecting rod with a bolt seat against which the bolt head engages. The bolt seat must be machined into the connecting rod and therefore a small fillet with a transverse surface exists adjacent to the bolt seat. It is known to provide the bolt head with a non-circular cross section which engages the fillet or transverse surface adjacent the bolt seat to prevent rotation of the bolt while tightening the nut. However, the peripheral edge of the bolt which engages the fillet and/or transverse surface adjacent to the bolt seat may cause undesirable stress concentrations in the connecting rod which may result in deformation or damage to the connecting rod.

The present invention is directed to overcoming one or more of the problems as set forth above.

DISCLOSURE OF THE INVENTION

In one aspect of the invention, a connecting rod assembly connects a piston to a crankshaft in an internal combustion engine. The connecting rod assembly includes a connecting rod having a yoke at an end thereof. The yoke includes a semi-circular bearing portion and a pair of shoulders. The yoke further includes at least two bolt holes associated with and opening at each shoulder. A cap is attached with the yoke, and includes a semi-circular bearing portion and a pair of shoulders. The cap further includes at least two bolt holes associated with each shoulder. Each bolt hole opens at a respective shoulder and is substantially coaxially aligned with a respective bolt hole in the yoke to define a mating pair of bolt holes. A plurality of bolts are each disposed in a respective mating pair of bolt holes and attach the cap with the yoke. Each bolt has a head with a non-circular cross section which abuts a head of an adjacent bolt and prevents unlimited rotation therebetween.

BEST MODE FOR CARRYING OUT THE INVENTION

Figure 1:
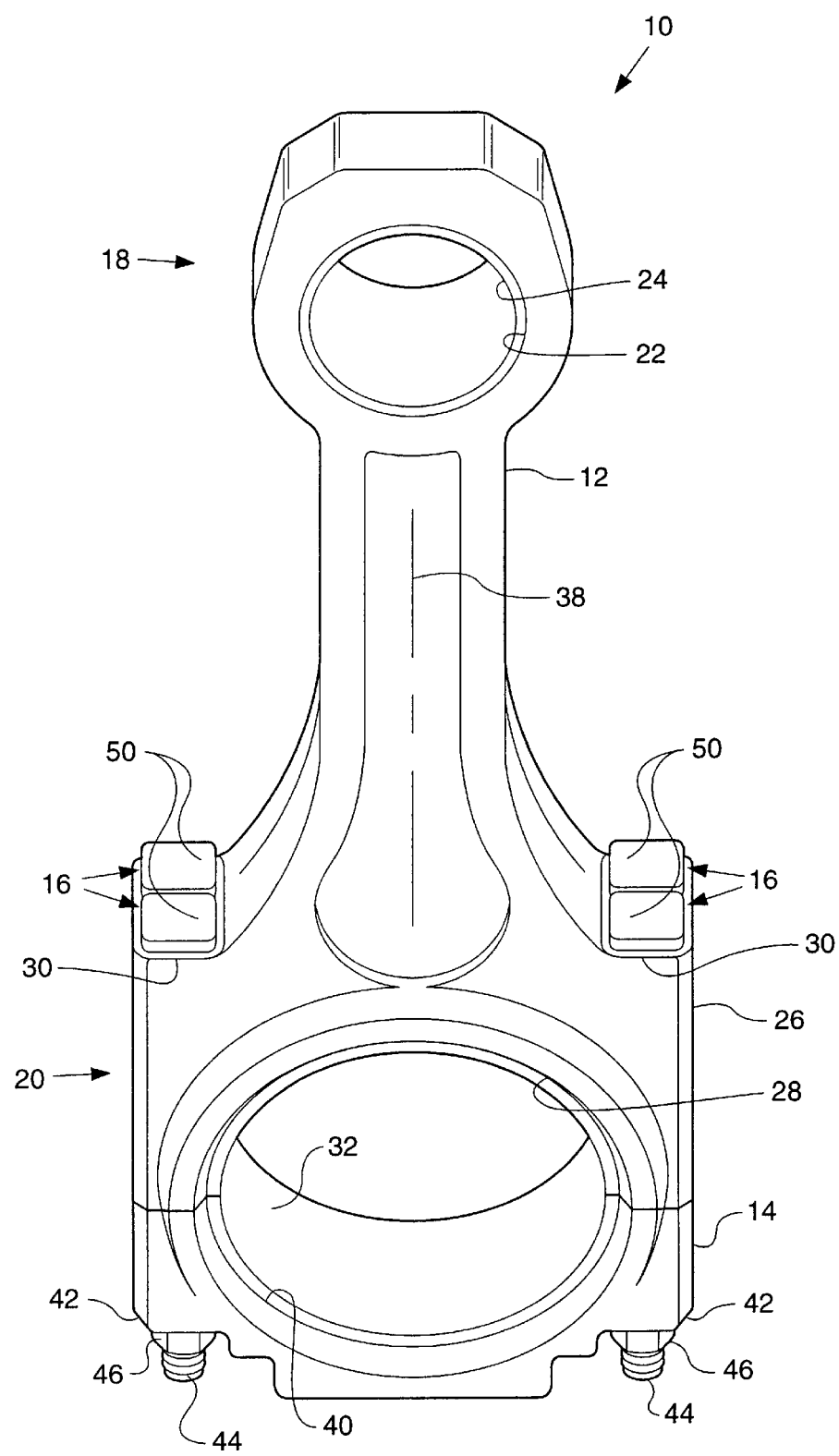
FIG. 1 is a perspective view of an embodiment of a connecting rod assembly of the present invention.
Figure 2:
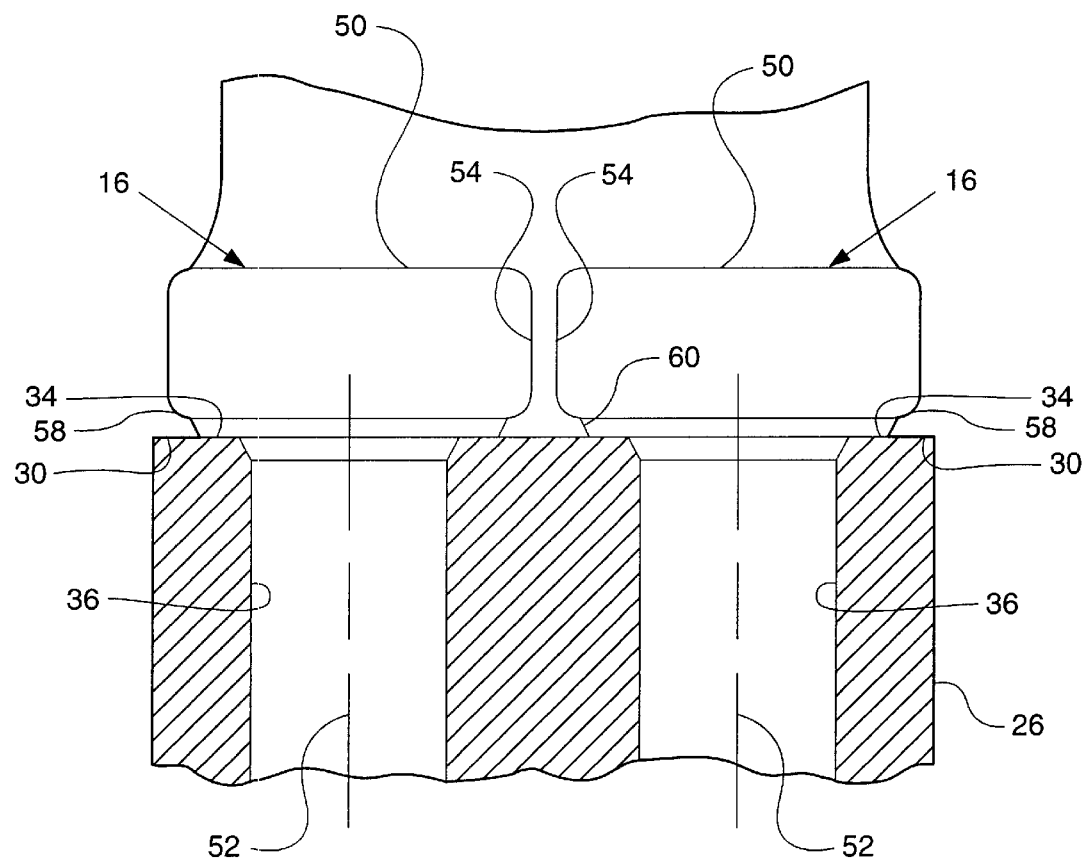
FIG. 2 is a fragmentary, side view of the connecting rod assembly in FIG. 1.

Referring now to the drawings, there is shown an embodiment of a connecting rod assembly 10 of the present invention for connecting a piston (not shown) to a crankshaft (not shown) in an internal combustion engine. Connecting rod assembly 10 generally includes a connecting rod 12, cap 14 and a plurality of bolts 16.

Connecting rod 12 includes a first end 18 and a second end 20. First end 18 includes an opening 22 with a reduced friction bearing 24 disposed therein. Bearing 24 has an internal diameter which is sized to receive a piston pin (not shown) for attaching connecting rod 12 with a piston.

Second end 20 includes a yoke 26 having a semi-circular bearing portion 28 and a pair of shoulders 30. Semi-circular bearing portion 28 is sized to receive a crankshaft (not shown) therein. In the embodiment shown, a reduced friction bearing in the form of a split steel backed aluminum bearing 32 is disposed radially within semi-circular bearing portion 28. Each shoulder 30 defines a bolt seat 34 which engages bolts 16.

Yoke 26 also includes at least two bolt holes 36 associated with each shoulder 30. Each bolt hole 36 extends to and opens at a respective shoulder 30. Bolt holes 36 are aligned substantially parallel with the longitudinal axis 38 of connecting rod 12.

Cap 14 includes a semi-circular bearing portion 40 which together with semi-circular bearing portion 28 define a circular opening for receiving the crankshaft of the internal combustion engine. Semi-circular bearing portion 40 also includes a reduced friction bearing in the form of a split steel backed aluminum bearing 32 disposed therein. Cap 14 also includes two shoulders 42 which are disposed generally parallel with shoulders 30 of yoke 26. Each shoulder 42 defines a bolt seat 44 against which a nut 46 associated with each bolt 16 is engaged. Cap 14 also includes at least two bolt holes 48 associated with each shoulder 42. Each bolt hole 48 extends to and opens at a respective shoulder 42. Bolt holes 48 are each substantially coaxially aligned with a respective bolt hole 36 in yoke 26. Thus, each bolt hole 48 in cap 14 and a corresponding bolt hole 36 in yoke 26 define a mating pair of bolt holes for receiving a respective bolt 16 therein.

Each bolt 16 extends through a mating pair of bolt holes 36 and 48 and attach cap 14 with yoke 26. The plurality of nuts 46 are each threadingly engaged with a respective bolt 16 and torqued to a desired load value. Nuts 46 may have any desired configuration, such as hex, etc.

Each bolt 16 has a head 50 with a non-circular cross section (as viewed from the top in FIG. 1) which is configured to abut a head 50 of an adjacent bolt 16 and thereby prevent unlimited rotation therebetween. In the embodiment shown, each bolt 16 has a head 50 with a substantially square cross-section with four adjoining substantially flat side surfaces. As is apparent from FIG. 3, the pair of bolt holes 36 in yoke 26 each have a longitudinal axis 52 defining a center-to-center distance therebetween. The distance between opposite substantially flat side surfaces is such that side surface 54 is disposed approximately ½ the center-to-center distance from a corresponding longitudinal axis 52. To allow ease of assembly, a small clearance distance is provided between bolt heads 50. In the embodiment shown, a clearance distance of approximately 0.010 inch is provided adjacent side surface 54 between bolt heads 50. Of course, since bolt heads 50 have a substantially square cross-section, bolts 16 may be rotated 90° or 180° from the position illustrated and still hold the same geometric relationship.

Figure 3:
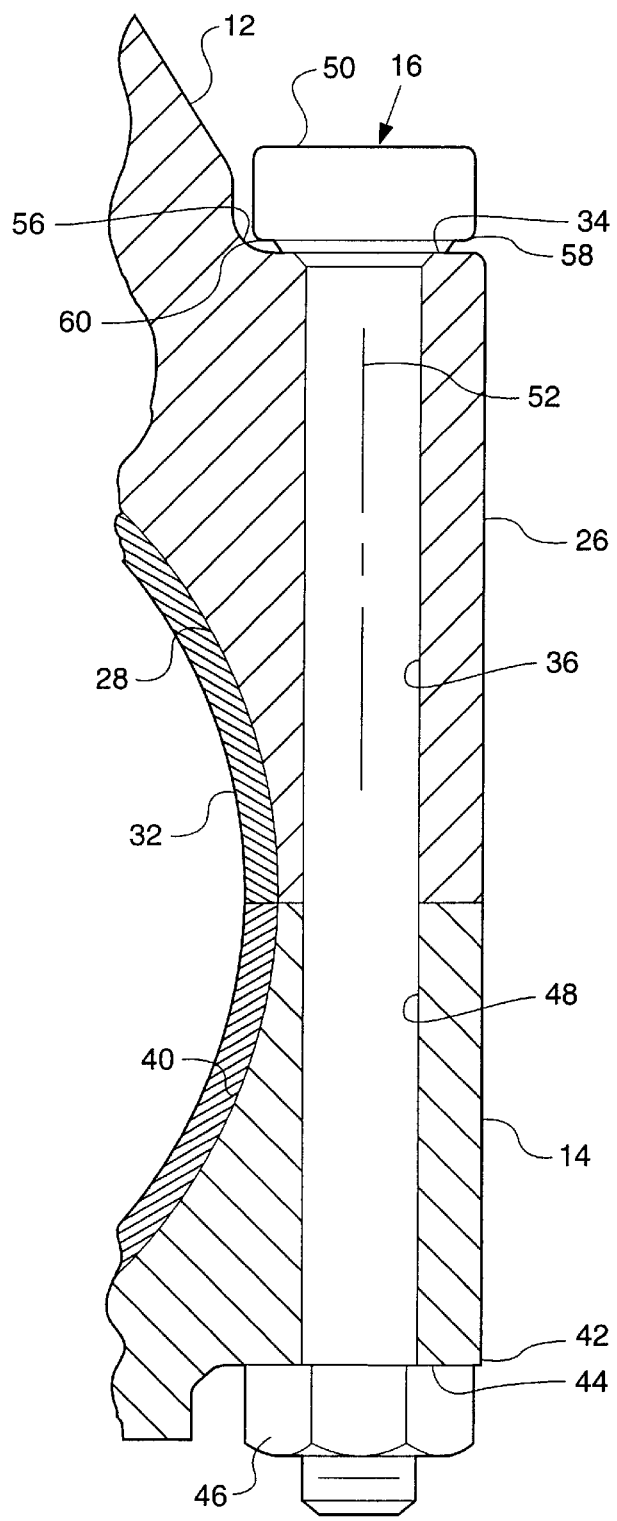
FIG. 3 is a fragmentary, end view of the connecting rod assembly in FIGS. 1 and 2.

With conventional connecting rod assembly configurations, the bolts which connect the cap to the yoke include a head which must either be held stationary with a wrench, or which engages the yoke itself to prevent rotation. As shown in FIG. 3, shoulder 30 defining bolt seat 34 is machined into connecting rod 12. Since it is very difficult and expensive to form a true right angle adjacent bolt seat 34, connecting rod 12 includes a fillet 56 adjacent bolt seat 34. Fillet 56 corresponds to the radius of a cutting tool which is used to machine bolt seat 34. With a conventional design in which bolt heads 50 engage connecting rod 12, the point contact against fillet 56 causes undesirable stress concentrations in connecting rod 12 which may lead to deformation or fracture. Additionally, conventional bolt heads requiring engagement with a tool to prevent rotation thereof have the problem of requiring access to bolt heads 50, which may not always be possible.

In contrast, bolt heads 50 of the present invention include a chamfered peripheral edge 58 with a radius of curvature which is smaller than the radius of curvature of fillet 56. The smaller radius of curvature of chamfer 58 ensures that bolt head 50 does not engage against fillet 56, thereby avoiding stress concentrations in connecting rod 12. Each bolt head 50 may also be provided with a slight riser 60 which further ensures that contact does not occur between bolt head 50 and fillet 56. In the embodiment shown, fillet 56 has a radius of curvature of approximately 8 mm and chamfer 58 has a radius of curvature of approximately 6 mm. By providing bolts 16 with heads 50 which engage against each other to prevent rotation therebetween, rather than against fillet 56 of connecting rod 12, stress concentrations are reduced in connecting rod 12 which may cause deformation or fracture.

INDUSTRIAL APPLICABILITY

To assemble connecting rod assembly 10, first end 18 is connected with a piston using a piston pin in known manner. Yoke 26 of second end 20 is placed over a crankshaft such that reduced friction bearing 32 in semi-circular bearing portion 28 surrounds the crankshaft. Cap 14 is placed over the other half of the crankshaft such that the crankshaft is received within reduced friction bearing 32 disposed within semi-circular bearing portion 40. Each bolt 16 is placed within a corresponding mating pair of bolt holes 36 and 48 which open at shoulders 30 and 42, respectively. Nuts 46 are threadingly engaged with the ends of bolts 16 which extend from shoulders 42, and are torqued to a desired value. The slight clearance distance between bolt heads 50 allows bolts 16 to be easily placed within the corresponding mating pair of bolt holes 36 and 48. During tightening of each nut 42, the corresponding bolt 16 may rotate slightly. The bolt head 50 of a bolt 16 being tightened engages against a bolt head 50 of an adjacent bolt 16 opening at the same shoulder 30. Bolt heads 50 do not engage against fillet 56 of connecting rod 12, thereby avoiding stress concentrations in connecting rod 12.

Other aspects, objects and advantages of this invention can be obtained from a study of the drawings, the disclosure and the appended claims.

What is claimed is:

1. A connecting rod assembly for connecting a piston to a crankshaft in an internal combustion engine, said connecting rod assembly comprising:

a connecting rod having a yoke at an end thereof, said yoke including a semi-circular bearing portion and a pair of yoke shoulders, said yoke further including at least two yoke bolt holes associated with each said yoke shoulder, each said yoke bolt hole opening at a respective said yoke shoulder;

a cap attached with said yoke, said cap including a semi-circular bearing portion and a pair of cap shoulders, said cap further including at least two cap bolt holes associated with each said cap shoulder, each said cap bolt hole opening at a respective said cap shoulder and being substantially coaxially aligned with a respective said yoke bolt hole to define a mating pair of bolt holes; and a plurality of bolts, each said bolt being disposed in a respective said mating pair of bolt holes and attaching said cap with said yoke, each said bolt having a head with a non-circular cross section which is configured to abut a head of an adjacent bolt and prevent unlimited rotation therebetween, and each said bolt having a riser below said head.

2. The connecting rod assembly of claim 1, wherein each said mating pair of bolt holes is disposed substantially parallel with an adjacent said pair of mating bolt holes.

3. The connecting rod assembly of claim 1, wherein each said bolt head has a substantially square cross section.

4. The connecting rod assembly of claim 1, wherein each said pair of mating bolt holes has a longitudinal axis, said longitudinal axis of an adjacent said pair of mating bolt holes defining a center-to-center distance therebetween, and wherein each said bolt head has a substantially flat surface disposed approximately one-half said center-to-center distance from said corresponding longitudinal axis.

5. The connecting rod assembly of claim 1, wherein each said yoke shoulder defines a bolt seat.

6. The connecting rod assembly of claim 5, wherein said yoke has a fillet along an edge of said bolt seat with a first radius, and wherein each said riser is disposed against a corresponding said bolt seat, said bolt head having a chamfered peripheral edge with a second radius which is smaller than said first radius, whereby said bolt head does not engage said fillet.

7. The connecting rod assembly of claim 6, wherein said fillet is approximately 8 millimeters and said chamfer is approximately 6 millimeters.

8. The connecting rod assembly of claim 1, further comprising a reduced friction bearing disposed within said semi-circular bearings of said yoke and said cap.

9. The connecting rod assembly of claim 1, wherein said yoke includes two bolt holes opening at each said yoke shoulder and said cap includes two bolt holes opening at each said cap shoulder.

10. The connecting rod assembly of claim 1, wherein each of said bolt heads have a cross section which is the same.

11. A method of assembling a connecting rod assembly in an internal combustion engine, said method comprising the steps of:

providing a connecting rod having a yoke at an end thereof, said yoke including a semi-circular bearing portion and a pair of yoke shoulders, said yoke further including at least two yoke bolt holes associated with each said yoke shoulder, each said yoke bolt hole opening at a respective said yoke shoulder;

providing a cap including a semi-circular bearing portion and a pair of capshoulders, said cap further including at least two bolt holes associated with each said cap shoulder, each said bolt hole opening at a respective said cap shoulder;

positioning said cap adjacent said connecting rod such that each said cap bolt hole is substantially coaxially aligned with a respective said yoke bolt hole to define a mating pair of bolt holes;

placing each of a plurality of bolts in a respective said mating pair of bolt holes, each said bolt having a head with a non-circular cross section and a riser below said head;

threading a nut on an end of each said bolt adjacent said cap shoulder; and preventing unlimited rotation of each said bolt in said corresponding mating pair of bolt holes by configuring each said bolt head to abut against an adjacent said bolt head.

* * * * *